Patented Apr. 14, 1942

2,279,743

UNITED STATES PATENT OFFICE 2,279,743

PROCESS FOR THE PRODUCTION OF MOLDABLE ARTIFICIAL MASSES

Fritz Pollak, Yonkers, N. Y.

No Drawing. Application March 7, 1940, Serial No. 322,700

8 Claims. (Cl. 18—55)

The invention relates to a process for the production of moldable artificial masses and it relates more particularly to the preparation of moldable artificial masses from casein and urea-formaldehyde condensation products.

The manufacture of mixed artificial masses from albuminous substances and hardenable synthetic resins and particularly urea and thiourea formaldehyde condensation products has been frequently suggested and tried. A practical success has not resulted from these endeavours. This failure may be due to the fact that albuminous substances e. g. casein are differently acted upon by formaldehyde and that immediately upon and simultaneously with the action of the formaldehyde entirely insoluble substances are formed.

It has also been tried to prepare from the urea and thiourea formaldehyde condensation products mixed colloids in order to protect the albuminous substances e. g. casein against the immediate action of the formaldehyde. The solubility of casein in an aqueous urea containing solution was utilized for this purpose and solutions of casein and urea were employed as initial or starting media. By adding comparatively small quantities of formaldehyde a coagulation or precipitation of the casein could be actually prevented; solutions of this type were used as adhesives.

Furthermore, it was observed that by addition of water to these solutions an albuminous precipitate was obtained which when treated by pressure and at an elevated temperature resulted in the formation of a translucent material. One might well assume that an urea salt of the casein had been formed which was acted upon by the formaldehyde.

It has further been tried to utilize for the present purpose the property of the urea methylol compounds to split off formaldehyde at an elevated temperature.

The method has not gained practical importance.

Exhaustive investigations carried out by the inventor have proven that this failure is due to the fact that the methylol compounds were employed in a dry state or as an aqueous solution. In using the dry products this way of processing necessitated a hotpressing operation lasting several hours whereas it is practically impossible to extend the pressing operation for more than a few minutes. Furthermore the use of solid urea methylol compounds is a very costly procedure due to the complicated method of manufacturing the same.

The use of aqueous solutions on the other hand is impractical due to their instability. If an aqueous solution of methylol ureas is mixed with an albuminous substance the disadvantage arises, that the latter becomes insoluble almost instantaneously.

It is the object of this invention to produce mixed masses of the present type in a very simple, easily controllable and highly efficient manner.

It is a further object to reduce the manufacturing time to a minimum.

It is a further object of the invention to produce the moldable artificial masses as entirely homogeneous moist powders and pastes and to shape bodies therefrom which have a good resistance to cold and warm water.

One of the important objects of the invention aims at the prevention of a premature attack upon the casein.

A further object of the invention consists in preserving the solubility of the urea condensation product during the shaping or pressing procedure for a certain time after the casein has become insoluble.

One of the objects of the invention is to greatly shorten the hardening time and to avoid the application of excessive pressure.

It is also an object of the invention to produce masses of the present type which may be easily colored, polished, mixed with other moldable materials and thinned down with fillers.

The invention is based on the property of methylol ureas to split off formaldehyde under certain conditions. Contrary, however, to known methods neither the solid methylol compounds nor the aqueous solutions thereof are used as it was found that under the present working conditions and within the temperature range employed the methylol ureas are easily decomposed by very small quantities of water.

Therefore, practically water-free neutral and preferably alcoholic solutions of the methylol ureas are employed in accordance with the invention and these practically waterfree solutions of methylol ureas are mixed and reacted with casein; a moist sticky powder results, which in the hot press is converted after a few minutes compression into a moist homogeneous mass; the casein becomes insoluble, whereas the methylol ureas still remain soluble. The latter are converted into the insoluble state by a short hardening between 80 to 120° C.

In carrying out the present method temperatures above 120° C. are avoided, as the casein at this temperature undergoes a brownish discoloration.

The thus obtained mixed mass remains unchanged and stable in the hot press if the following operating conditions are maintained:

1. The use of water for preparing the methylol urea solutions must be strictly avoided and therefore alcoholic solutions are employed. The application of methylalcohol is preferred as it is not hygroscopic. Higher alcohols may be used; their methylol urea-dissolving property, however, is not as efficient as that of methylalcohol.

2. Care must be taken that during the hardening procedure the formation of water is avoided. Furthermore, the solution must not be allowed to develop a hydrogen-ion concentration exceeding pH 5.

It is advisable for this purpose to add phthalimide or the alkyl- and aryl-derivatives thereof.

3. The pressing temperature lies at 70 to 120° C. Under the operating conditions as listed under 1 and 2 a partial drying out of the masses in the press may result, which may prevent the obtainment of homogeneous masses. To obviate this disadvantage the addition of neutral waterfree solvents having a higher boiling point and being able to maintain the methylol ureas in solution should be added.

Suitable substances are those alcohols or mixtures of the same of which the boiling point lies in the vicinity of or above the pressing temperature e. g. propyl-, isopropyl-, butyl alcohol. The presence of these solvents has the further advantage that it prevents the drying out of the mass at normal temperature.

The pressed bodies may after a short pressing period be easily removed from the mold and the process may be carried out continuously. Entirely homogeneous products are obtained which harden quickly at a temperature of between 80 to 110° C.; they can be easily highly polished by means of hypochlorite solutions.

If the relative quantities of the components are properly chosen masses are obtained which show a good resistance to cold and hot water. They may be easily colored or mixed with other moldable materials; they may also be thinned-down by adding fillers or inert substances e. g. of the cellulose type or asbestos.

*Example*

1. Dimethylol urea is produced by dissolving 30 parts by weight of urea, 30 parts paraformaldehyde and 0.125 part of sodiumhydrate in 25 parts of methylolalcohol at a temperature of 35 to 45° C. 3 parts of phthalimide are added which are readily dissolved upon a short time stirring. The solution is mixed at ordinary temperature with a moist mixture of 100 parts acid casein and 15 parts of propylalcohol. The thus obtained sticky powder may be directly pressed or the easily volatile portion of the alcohol may be first evaporated at normal pressure or in vacuo and hereby recovered.

Upon removal of the methyl-alcohol the mass represents a moist powder which may be stored in a closed container and is ready for commercial handling. The pressed bodies made thereof are transparent and are easily removed from the hot or from the cold pressing mold. They are elastic and they may be easily hardened by heating to 80 to 110° C.

If the pressed bodies are treated with a 2% solution of sodium hypochlorite at 60 to 70° C. for three minutes they assume a bright and polished exterior.

The masses may also be treated in a screw press.

Instead of acid casein ferret casein may be employed.

What I claim is:

1. Process for the production of moldable artificial masses comprising mixing practically waterfree solutions of methylol ureas with casein in proportions to form a moist sticky powder, pressing the still moist product into a homogeneous body at a temperature between 70° to 120° C. and hardening the same at a temperature not exceeding 120° C.

2. Process for the production of moldable artificial masses comprising mixing practically waterfree solutions of methylol ureas with casein in proportions to form a moist sticky powder, pressing the still moist product into a homogeneous body at a temperature between 70° to 120° C. in the presence of waterfree solvents having a comparatively high boiling point to substantially prevent its drying-out during the pressing procedure and hardening the same at a temperature not exceeding 120° C.

3. Process for the production of moldable artificial masses comprising mixing practically waterfree solutions of methylol ureas with casein in proportions to form a moist sticky powder, pressing the still moist product into a homogeneous body at a temperature between 70° to 120° C. in the presence of at least one of the substances selected from a group consisting of practically waterfree propylalcohol, isopropylalcohol and butyl alcohol to substantially prevent its drying-out during the pressing procedure and hardening the same at a temperature not exceeding 120° C 4. Process for the production of moldable artificial masses comprising mixing practically waterfree alcoholic solutions of methylol ureas with casein and at least one substance selected from a group consisting of dibasic acid imides and alkyl- and aryl derivatives in proportions to form a moist sticky powder, pressing the still moist product into a homogeneous body at a temperature between 70° to 120° C. and under conditions to substantially prevent its drying out, during the pressing procedure and hardening the same at a temperature not exceeding 120° C.

5. Process for the production of moldable artificial masses comprising mixing practically waterfree slightly alkaline alcoholic solutions of methylol ureas in the presence of phthalimide with casein and propylalcohol in proportions to form a moist sticky powder, pressing the still moist product into a homogeneous body at a temperature between 70° to 120° C ., and hardening the same at a temperature between 80° and 120° C.

6. As a new composition a moldable, hardenable, moist homogeneous pulverulent mass prepared by the interaction of practically waterfree solutions of methylol urea compounds and casein and containing at least 50% by weight of the latter.

7. A new article of manufacture pressed from a mass according to claim 6 at a temperature of 80 to 120° C. and hardened at a temperature not exceeding 120° C.

8. As a new composition a moldable, hardenable, moist homogeneous pulverulent mass prepared by the interaction of practically waterfree solutions of methylol urea compounds and casein.

FRITZ POLLAK.